United States Patent [19]

Wohlabaugh

[11] 3,996,445
[45] Dec. 7, 1976

[54] TIMING SEQUENCE CONTROL SYSTEM FOR ELECTRICAL DISCHARGE MACHINING

[75] Inventor: Leonard M. Wohlabaugh, Miller Place, N.Y.

[73] Assignee: Eltee Pulsitron (Entire), West Caldwell, N.J.

[22] Filed: Feb. 3, 1975

[21] Appl. No.: 546,787

[52] U.S. Cl. .......................... 219/69 C; 219/69 G
[51] Int. Cl.² ......................................... B23P 1/08
[58] Field of Search ............. 219/69 C, 69 P, 69 S, 219/69 M, 10.77; 307/226

[56] References Cited

UNITED STATES PATENTS

| | | | |
|---|---|---|---|
| 3,697,879 | 10/1972 | Holliday | 307/226 |
| 3,778,579 | 12/1973 | Takanade | 219/69 C |
| 3,805,012 | 4/1974 | Bell et al. | 219/69 C |
| 3,809,848 | 5/1974 | Bell | 219/69 C |
| 3,823,297 | 7/1974 | Cunningham | 219/10.77 |
| 3,843,864 | 10/1974 | Wohlabaugh | 219/69 C |
| 3,875,362 | 4/1975 | Balleys | 219/69 C |

*Primary Examiner*—Bruce A. Reynolds
*Attorney, Agent, or Firm*—Clarence A. O'Brien; Harvey B. Jacobson

[57] ABSTRACT

On-time and off-time control over the current pulses by the timing unit associated with the power supply for EDM apparatus is supervised by fault condition and voltage drop detectors to modify automatic operation of the timing unit. The fault condition detectors monitor gap conditions, and track voltage variations of the dc cutting current supply.

8 Claims, 2 Drawing Figures

TIMING SEQUENCE CONTROL SYSTEM FOR ELECTRICAL DISCHARGE MACHINING

This invention relates to power supplies for EDM apparatus and in particular power supplies having timing means for automatically controlling the on-time and off-time of the current pulses.

Power supplies for EDM apparatus are well known and in some cases include a timing control to automatically determine the pulse width and spacing associated with the supply of cutting current to the electrode through a switching device. Such a timing control is disclosed in U.S. Pat. No. 3,697,879 to Holliday, owned by the assignee of the present application. However, such timing control cannot take into account various fault conditions that occur such as changes in gap impedance and untimely voltage drops in the gap between the electrode and the workpiece, and excessive variations in the cutting current supplied to the switching device, under certain load conditions. It is therefore an important object of the present invention to improve the machining ability of EDM apparatus and prevent damage to the workpiece because of fault conditions by modifying automatic operation of the timing control.

In accordance with the present invention, operation of the aforementioned timing control is modified by initiating the on-time counting sequence therein under control of a voltage drop detector in response to actual approach of the electrode to the workpiece to obtain a precise on-time pulse. Further, operation of the timing unit is disabled in response to fault conditions detected by a gap condition detector, a sample and hold circuit connected to the electrode and a voltage tracking circuit variation of the dc power supply. The fault condition signals are processed by a pulse to pulse cut-off detector connected to the timing unit through a operation disabling gate.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
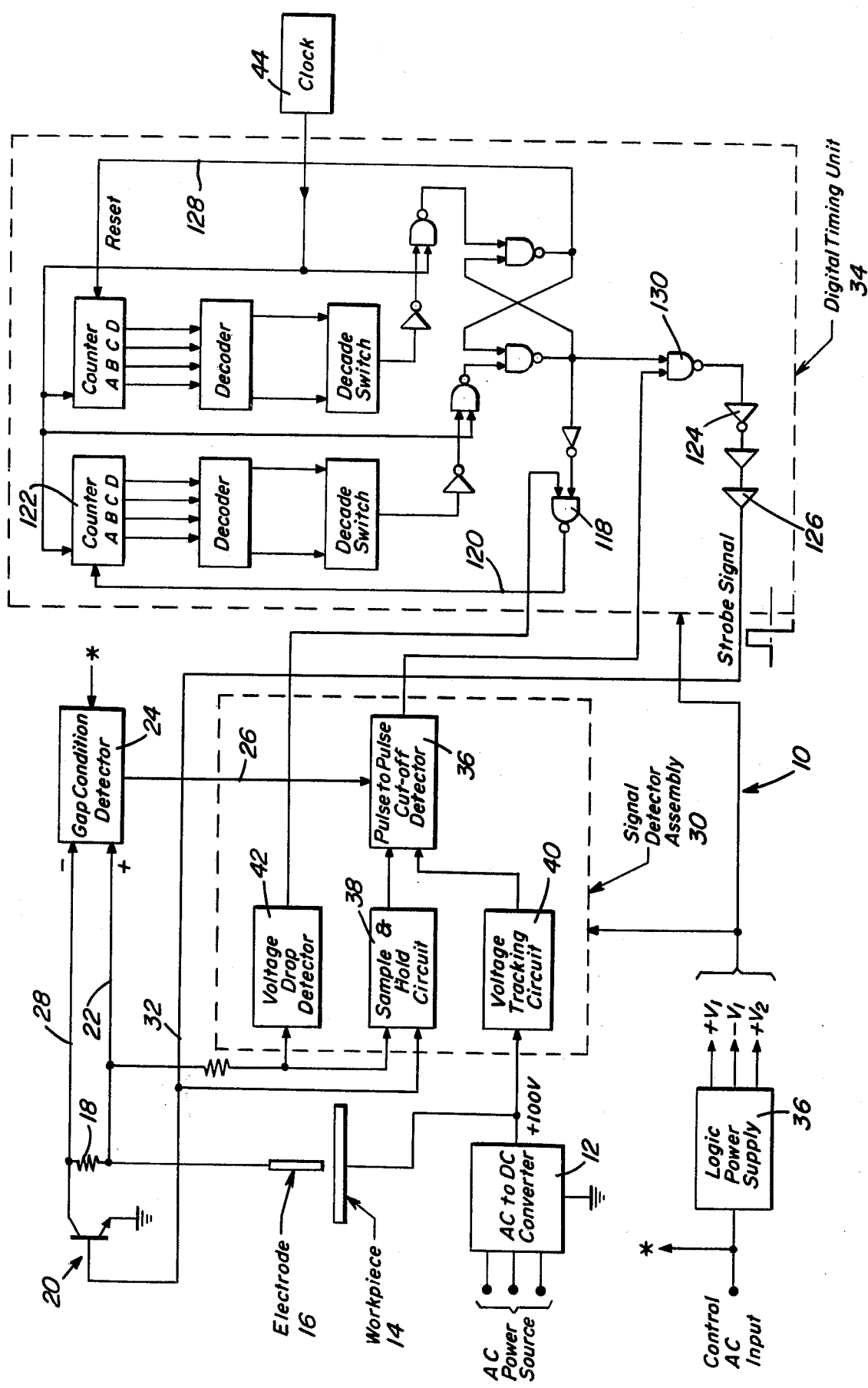
FIG. 1 is a schematic block diagram illustrating the system of the present invention.

Referring now to the drawings in detail, FIG. 1 schematically illustrates the system of the present invention generally referred to by reference numeral 10. The system includes a power converter 12 connected to a 3 phase, AC power source for supplying a dc cutting current at +100 volts, for example, to a workpiece 14 spaced by a spark gap from the electrode 16 in an electrical discharge machining apparatus, generally well known to those skilled in the art. The electrode 16 is connected by a current limiting resistor 18 to a switching transistor 20 by means of which current conducting circuit is completed to ground during EDM operation. The electrode is also connected by conductor 22 to the positive input terminal of a gap condition detector 24 of a type disclosed in my prior U.S. Pat. No. 3,843,864, issued Oct. 22, 1974, whereby the voltage condition in the gap between the electrode and workpiece is monitored. The output of the gap condition detector in line 26 is normally set at a high logic 1 condition and in addition to the positive input to which conductor 22 is connected, the detector 24 has a negative input connected by conductor 28 to the collector of the switching transistor 20. The output signal line 26 of the gap condition detector 24 is connected to a signal detector assembly 30 also having input signals fed thereto from the electrode 16 through conductor 22 and from a strobe signal line 32 connected to the base of switching transistor 20. The strobe or timing signals in line 32 are derived from a digital timing unit 34 which is similar to the pulse on and off time control disclosed in U.S. Pat. No. 3,697,879 aforementioned. These signals are operative through the base of the switching transistor 20 to control the on-time and off-time current phases of an electrical discharge machining cycle. The requisite voltages for operating the digital timing unit 34 are supplied by a logic power supply 36 which also supplies operating voltages to the signal detector assembly 30.

The timing unit 34 is similar to the timing unit disclosed in U.S. Pat. No. 3,697,879 but modified to cooperate with the signal detector assembly 30 added to the basic power supply system associated with EDM apparatus, in accordance with the present invention, to improve machining ability and prevent damage because of malfunction. The switching signal output of the timing unit 34 is accordingly cut off in a timely manner in response to a fault condition, by a cut-off signal from a pulse to pulse cut-off detector 36 in the signal detector assembly 30. Operation of the pulse to pulse cut-off detector is jointly controlled by a sample and hold circuit 38 and a voltage tracking circuit 40. The sample and hold circuit is connected to the timing signal line 32 to synchronize its control function in storing and transmitting fault condition signals received through line 22 connected to the electrode 16. Fault conditions reflected by excessive variations in dc cutting voltage are monitored by the voltage tracking circuit 40. Precision in the timing of the machining pulses is obtained by the voltage drop detector 42, also connected to line 22, for initiating an on-time counting sequence in the timing unit 34 when the electrode 16 approaches the workpiece. The timing base for the timing unit 34 is obtained from a suitable clock 44.

Figure 2:
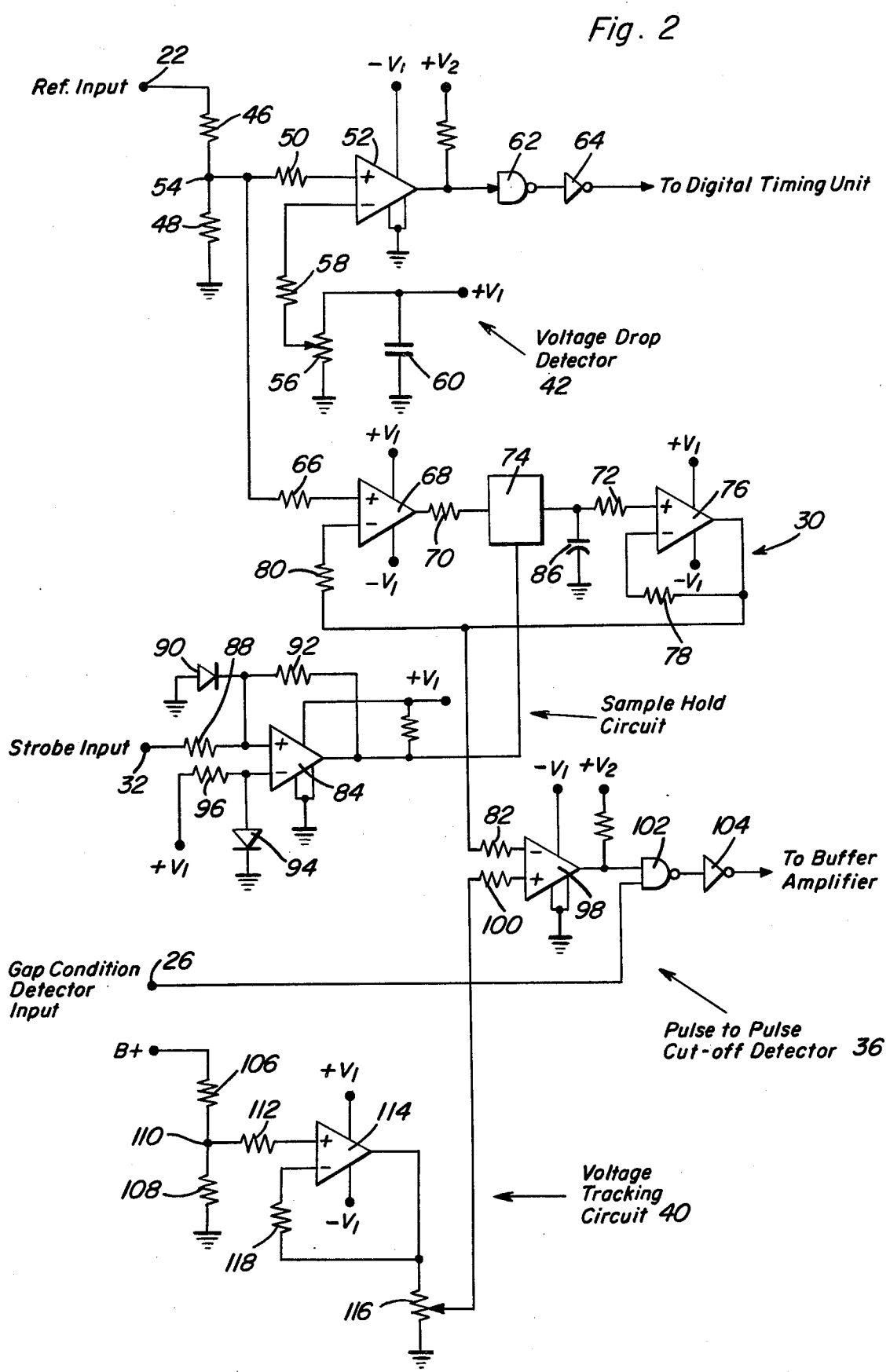
FIG. 2 is a circuit diagram of the signal detector assembly shown in FIG. 1.

The voltage drop detector 42 as shown in FIG. 2 is connected to the electrode 16 through a voltage divider including resistors 46 and 48 to monitor the voltage across the workpiece 14 and electrode. The voltage signal from the electrode is attenuated through current limiting resistor 50 and fed to the non-inverting input terminal of a voltage comparing amplifier 52. Thus, when the electrode 16 approaches the workpiece during a normal EDM operation, at a predetermined point the spark gap will ionize causing the voltage at the junction 54 of the voltage dividing resistors to go positive. This produces a change in state at the output of comparator amplifier 52 from a normally zero logic as the voltage at the non-inverting input becomes approximately equal to the threshold voltage at the inverting input established by the setting of potentiometer 56. The potentiometer is connected to the inverting input terminal through a current limiting resistor 58. The grounded capacitor 60 connected in parallel shunt relation to the potentiometer acts as a by-pass filter. The output of the amplifier 52 is connected through an inverting schmidt trigger 62 and a logic inverter buffer 64 to the digital timing unit. The schmidt trigger 62 provides noise immunity between the output of the comparator 52 and the timing unit whereas the inverter buffer 64 inverts the signal output of the trigger to properly drive the timing unit.

With continued reference to FIG. 2, the voltage signal at the junction 54 to the voltage drop detector 42 is also fed through a current limiting resistor 66 to the non-inverting input of amplifier 68 in the sample and hold circuit 38. The amplifier 68 is connected in an open loop through current limiting resistors 70 and 72 in series with a normally open analog switch 74 between the output of amplifier 68 and the non-inverting input of operational amplifier 76. The amplifier 76 is connected in a unity gain arrangement by feedback resistor 78 between its output terminal and the inverting input. The loop is completed by a current limiting resistor 80 between the output of amplifier 76 and the inverting input of amplifier 68. The loop is closed when the analog switch 74 is turned on to provide an output voltage signal from amplifier 76 to the pulse to pulse cut-off detector 36 through current limiting resistor 82.

The analog switch 74 is turned on by the signal output or high logic state of a voltage comparator 84 to place a charge on capacitor 86 dependent on the state of the amplifier 68. The capacitor 86 which is connected to ground between the analog switch 74 and the resistor 72 will store its charge when the output of the voltage comparator 84 goes to a low logic state. When comparator 84 goes high again the capacitor discharges. The analog switch 74 may consist of an FET transistor, MOS transistor, or a monolithic integrated circuit.

The change in logic state at the output of voltage comparator 84 is controlled by the strobe timing signal applied from the timing unit 34 through resistor 88 to the non-inverting input of the comparator 84. A grounded diode 90 connected to the non-inverting input limits the input voltage to approximately 0.7 volts below the common ground while resistor 92 conducts positive feedback from the output to the non-inverting input to obtain a schmidt trigger action. Grounded diode 94 and voltage supply resistor 96 connected to the inverting input of the voltage comparator 84 develops the compare voltage at the non-inverting input. The strobe signal is thereby effective to close the analog switch 74 causing the output of amplifier 76 to rise very rapidly and assuming that the non-inverting input of amplifier 68 is at some positive potential, the voltage signal will be conducted through resistors 70 and 72 to charge capacitor 86 and feedback a voltage from amplifier 76 through resistor 80 to the inverting input until both inputs of amplifier 68 are approximately equal. The reference input signal from the electrode 16 is thereby sampled and held in the circuit 38 in such a manner as to minimize losses occurring because of voltage drops across resistors 70 and 72 and the analog switch 74.

The output of the sample and hold circuit 38 is applied through resistor 82 to the inverting input of voltage comparator 98 in the pulse to pulse cut-off detector, this comparator having a normally high logic state at its output. When the voltage at the inverting input is slightly below the compare voltage applied to the non-inverting input through current limiting resistor 100, the comparator 98 will change state from logic 1 to logic 0 reflecting the sensing of a fault condition. The output of the comparator is connected to one input of a schmidt trigger 102 in series with inverter 104 to supply a correct logic signal reflecting a fault condition to the timing unit 34. The other input of the schmidt trigger 102 receives signals from the gap condition detector 24 which is normally set at a high logic 1 condition. Thus, if the gap condition detector 24 goes low, this also supplies a zero logic signal to the timing unit 34 for disabling the same and cutting off current therefrom.

The compare voltage at the non-inverting input of comparator 98 in the pulse to pulse cut-off detector 36 is derived through the voltage tracking circuit 40 from the dc cutting current output of power converter 12. The voltage tracking circuit 40 is operative to compensate for variations in the dc voltage which may be as much as 10 volts under certain load conditions. The dc input voltage is applied to voltage dividing resistors 106 and 108 so that a reduced voltage at junction 110 may be applied through current limiting resistor 112 to the non-inverting input of a buffer amplifier 114, the output of which drives potentiometer 116 through which the compare voltage is adjustably set. The amplifier 114 is connected as a voltage follower with unity gain by feedback resistor 118 between the amplifier output and the inverting input.

Referring again to FIG. 1, the output of the voltage drop detector 42 is fed to one enabling input of NAND gate 118 in the timing unit 34 to switch it from its normal logic 0 state to a high logic 1 condition. An on-time reset signal in line 120 is thereby fed to an on-time counter 122 to start an on-time counting sequence as disclosed in prior U.S. Pat. No. 3,697,879, aforementioned. The other input of gate 118 is maintained high until the on-time counting sequence is completed in order to feed a timing output through inverter 124 and buffer amplifiers 126 to the sample and hold circuit 38 and the base of switching transistor 20. Upon completion of the on-time counting sequence, the voltage drop detector goes low to disable gate 118 while an off-time counting sequence in a separate off-time counter is automatically started through reset line 128. The voltage drop detector 42 will then wait for another voltage drop in response to the electrode approaching the workpiece to start another on-time counting sequence by enabling gate 118.

The output of the timing unit is applied to gate 130, which is enabled by an input from the pulse to pulse cut-off detector 36 normally set at a logic "1" condition to allow passage of the timing signal to inverter 124. The timing signal is thereby inverted to the proper logic level and amplified by the buffer amplifiers 126 to supply the strobe timing signals aforementioned driving the switching transistor 20 and the sample and hold circuit 38. The output collector of the switching transistor 20 is connected to the negative input of the gap condition detector circuit 24 as disclosed in my prior U.S. Pat. No. 3,843,864. The collector is also connected through the current limiting resistor 18 to the electrode, the positive input of the gap condition detector and the reference voltage input for the voltage drop detector 42 and the sample and hold circuit 38 as aforementioned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a power supply for the electrode and workpiece of an EDM apparatus having switching means for conducting current pulses from a power source through a gap between the electrode and workpiece and timing means connected to the switching means for controlling the duration of and spacing between said pulses respectively, an improvement including a voltage detector connected to said electrode for monitoring the volt drop across the gap, gate means connected to the voltage detector for enabling pulse on-time operation of the timing means in response to a predetermined volt drop across the gap, condition monitoring means connected to the electrode and workpiece for detecting fault conditions, and pulse cut-off means connected to the condition monitoring means for disabling operation of the timing means independently of said pulse on-time operation in response to detected fault conditions to vary the spacing between said pulses.

2. The combination of claim 1 including a gap condition detector interconnected between the electrode and the pulse cut-off means for enabling operation thereof.

3. In combination with a power supply for the electrode and workpiece of an EDM apparatus having switching means for conducting current pulses from a power source through a gap between the electrode and workpiece and timing means connected to the switching means for controlling the duration of and spacing between said pulses, an improvement including gate means for enabling operation of the timing means, condition monitoring means connected to the electrode and workpiece for detecting fault conditions, pulse cut-off means connected to the condition monitoring means and the gate means for disabling operation of the timing means in response to detected fault conditions, voltage detector means connected to the electrode for detecting approach of the electrode to the workpiece, and reset means connecting the voltage detector means to the timing means for initiating a pulse on-time operational phase, said timing means including means for automatically initiating an off-time operation phase upon completion of the on-time phase.

4. The combination of claim 3 wherein said condition monitoring means includes a sample and hold circuit connecting the electrode to the pulse cut-off means, voltage tracking means connecting the power source to the pulse cut-off means and means connecting the timing means to the sample and hold circuit for synchronizing operation thereof with the voltage detector means.

5. The combination of claim 4 including a gap condition detector interconnected between the electrode and the pulse cut-off means for enabling operation thereof.

6. The combination of claim 3 including a gap condition detector interconnected between the electrode and the pulse cut-off means for enabling operation thereof.

7. In combination with a power supply for the electrode and workpiece of an EDM apparatus having switching means for conducting current pulses from a power source through a gap between the electrode and workpiece and timing means connected to the switching means for controlling the duration of and spacing between said pulses, an improvement including gate means for enabling operation of the timing means, condition monitoring means connected to the electrode and workpiece for detecting fault conditions, and pulse cut-off means connected to the condition monitoring means and the gate means for disabling operation of the timing means in response to detected fault conditions said condition monitoring means including a sample and hold circuit connecting the electrode to the pulse cut-off means, voltage tracking means connecting the power source to the pulse cut-off means and means connecting the timing means to the sample and hold circuit for synchronizing operation thereof.

8. The combination of claim 7 including a gap condition detector interconnected between the electrode and the pulse cut-off means for enabling operation thereof.

\* \* \* \* \*